US010151668B2

(12) United States Patent
Hagshenas et al.

(10) Patent No.: US 10,151,668 B2
(45) Date of Patent: Dec. 11, 2018

(54) SYSTEMS AND METHODS FOR DETECTING ENGINE VIBRATION (71) Applicant: United Technologies Corporation, Hartford, CT (US)

(72) Inventors: Behzad Hagshenas, San Diego, CA (US); Thomas T. Yacono, San Diego, CA (US)

(73) Assignee: United Technologies Corporation, Farmington, CT (US)

(*) Notice: Subject to any disclaimer, the term of this patent is extended or adjusted under 35 U.S.C. 154(b) by 315 days.

(21) Appl. No.: 15/099,495

(22) Filed: Apr. 14, 2016

(65) Prior Publication Data
US 2017/0299469 A1 Oct. 19, 2017

(51) Int. Cl.
G01M 15/12 (2006.01)
G01P 21/02 (2006.01)
G01H 1/00 (2006.01)

(52) U.S. Cl.
CPC ............ *G01M 15/12* (2013.01); *G01H 1/006* (2013.01); *G01P 21/02* (2013.01)

(58) Field of Classification Search
None
See application file for complete search history.

(56) References Cited

U.S. PATENT DOCUMENTS

| 3,520,201 | A | * | 7/1970 | Parker ................. G05D 13/00 137/53 |
| 3,921,127 | A | * | 11/1975 | Narbaits-Jaureguy ...................... G08G 1/164 340/901 |
| 2004/0249520 | A1 | | 12/2004 | Maine |
| 2007/0250245 | A1 | * | 10/2007 | van der Merwe .... F01D 21/003 701/100 |
| 2016/0010494 | A1 | | 1/2016 | Erlund |

FOREIGN PATENT DOCUMENTS

CN    202512137    10/2012

OTHER PUBLICATIONS

EP Search report dated Sep. 6, 2017 in EP Application No. 17167019.3.
Hai Qiu et al., "Evaluation of Filtering Techniques for Aircraft Engine Condition Monitoring and Diagnostics", 2008 International Conference on Prognostics and Health Management, 2008, pp. 1-8.

* cited by examiner

Primary Examiner — Lail A Klienman
(74) Attorney, Agent, or Firm — Snell & Wilmer L.L.P.

(57) ABSTRACT

Systems and methods of monitoring health of rotating engine components are provided. The systems and methods may receive a measurement from a speed sensor, detect the measurement from the speed sensor indicates a vibration of an engine, determine the vibration of the engine persisted for a predetermined duration, and signal the vibration of the engine is detected.

14 Claims, 5 Drawing Sheets

SYSTEMS AND METHODS FOR DETECTING ENGINE VIBRATION

FIELD

The disclosure relates generally to gas turbine engines, and more particularly to systems and methods for detecting engine vibration.

BACKGROUND

Rotating turbomachinery such as, for example, gas turbine engines and auxiliary power units (APU) utilize speed sensors to detect the rotor speed. Rotor speed is monitored for performance and safety reasons. The engine controller may, for example, adjust the fuel flow to maintain a prescribed speed for any load driven by the engine. Typically at least two speed sensors are used for reliability and for safety.

If the speed sensor readings diverge, the controller may control to the higher speed reading. If both speed sensor readings become erratic, the controller may shut the engine off. For example, the controller may deduce that it cannot control the engine speed in response to an erratic reading. In some instances, erratic readings may result from engine vibrations physically shifting the speed sensors. As a result of shifts, the values read by the speed sensors may fluctuate between high speeds and low speeds at a more rapid rate than the monitored engine can possibly accelerate or decelerate or the two speed readings may diverge and converge to indicate engine vibration. Engine vibration may be caused by various sources.

Engine health in gas turbine engines may be monitored for safety reasons and to perform maintenance as needed. One sign of engine health may be the vibration signature of the engine. When the vibration level exceed a certain level, it may be desirable to shut off the engine or to schedule a maintenance action. However, vibration monitoring equipment may be cumbersome and expensive. Furthermore, many engines do not carry additional health monitoring system.

SUMMARY

A method of monitoring engine health is provided. The method may include the steps of receiving a measurement from a speed sensor, detecting the measurement from the speed sensor indicates a vibration of an engine, determining the vibration of the engine persisted for a predetermined duration, and signaling the vibration of the engine is detected.

In various embodiments, the measurement from the speed sensor may be generated in response to rotation of a phonic wheel. Signaling that a vibration of the engine is detected may include requesting maintenance, illuminating an in-cockpit indicator, shutting down the engine, and/or reducing a speed of the engine. Detecting the measurement from the speed sensor may include detecting the measurement is fluctuating between a low-speed threshold and a high-speed threshold over a predetermined time interval. The low-speed threshold may be, for example, less than 50 Hz. The high-speed threshold may be, for example, greater than 350 Hz. The predetermined time interval may be between 0.060 second and 1 hour.

A health monitoring system is also provided. The system may include a controller and a speed sensor in electronic communication with the controller. They may be configured to detect a vibration of an engine in response to an erratic signal from the speed sensor. A phonic wheel may be disposed proximate the speed sensor with the speed sensor configured to detect rotation of the phonic wheel. A spring may be configured to press the speed sensor towards the phonic wheel.

In various embodiments, the spring constant of the spring may be selected based at least partially on a weight of the speed sensor. A housing may be configured to retain the speed sensor in a cavity with the speed sensor disposed between the spring and the phonic wheel. The speed sensor may be configured to vibrate within the cavity in response to the vibration of the engine. The speed sensor may thus translate away from the phonic wheel within the cavity in response to the vibration of the engine having an amplitude greater than a predetermined value. The phonic wheel may be fixed to a rotating engine component.

An article of manufacture is also provided. The article may include a non-transitory, tangible computer readable storage medium having instructions stored thereon that, in response to execution by a processor, cause the processor to perform operations. The operations may include receiving a measurement from a speed sensor configured to detect a rotational frequency of a rotating member, detecting a vibration of an engine in response to the measurement from the speed sensor indicating erratic engine speeds, and signaling that the vibration of the engine is detected.

In various embodiments, the measurement from the speed sensor may be generated in response to rotation of the rotating member. Signaling that the vibration of the engine is detected may include requesting maintenance, illuminating an in-cockpit indicator, shutting down the engine, and/or reducing a speed of the engine. Detecting an engine vibration may also include detecting the measurement is fluctuating between a low-speed threshold and a high-speed threshold over a predetermined time interval. For example, the low-speed threshold may be less than 50 Hz, and the high-speed threshold may be greater than 350 Hz. Operations may also include determining the vibration of the engine has persisted for a predetermined duration.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure utilizes speed sensors that are mounted on the engine/APU with a preloaded spring. In case of high level of vibration of the engine/APU, the speed sensor experiences high acceleration loads. The acceleration loads may cause the sensor to vibrate and thereby vary the distance between the sensor and the rotating shaft which the sensor is configured to monitor. The vibration of the sensor may be within the constraint of its preload spring installation.

In response to vibration of the speed sensor, a controller may command the engine to shut off and/or send a maintenance message. The spring preload may be adjusted to ensure that a predetermined amplitude of vibration will cause the bouncing of the speed sensor, but smaller amplitudes of vibration may not. Varying redundancies and alternate mounting configurations may be implemented. For example, two speed sensors within a body may be used with a sensor preloaded with a spring at one location and a fixed mounting point at another. The reading of the preloaded sensor may thus be compared to the reading from a fix mounted sensor. Two speed sensors may also be mounted at two different locations, with one sensor having a preload spring to detect the vibration and a second that is bolted solidly to the engine/APU which is not affected by high vibration.

Figure 1:
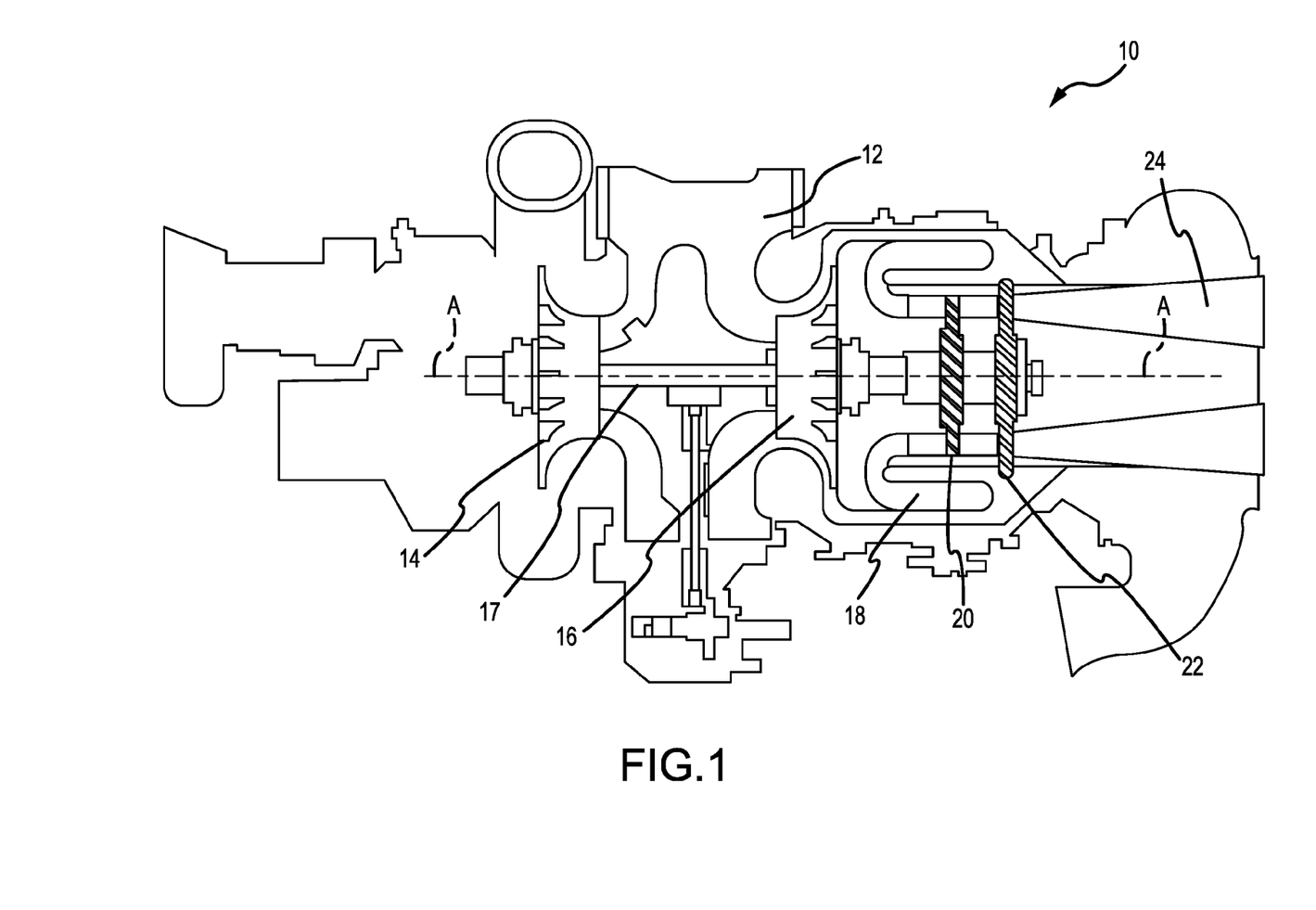
FIG. 1 illustrates an exemplary gas turbine engine, in accordance with various embodiments.

With reference to FIG. 1, an exemplary APU 10 is shown, in accordance with various embodiments. APU 10 may have one or more speed sensors configured to monitor the rotational speed of the varying rotational components of APU 10. APU 10 may include a compressor 16 for pressurizing incoming air from inlet 12. A combustor 18 may be disposed aft of compressor 16. A shaft 17 may rotatably couple the rotating components of APU 10. The pressurized air may be mixed with fuel and ignited in the combustor 18, generating an annular stream of hot combustion gases moving towards exhaust duct 24. A turbine 20 and turbine 22 may be aft of the combustor 18 and is also mechanically coupled to compressor 16 and load compressor 14 respectively through a shaft. Turbine 20 and turbine 22 may extract energy from the combusted gases exiting the combustor 18. Although FIG. 1 depicts an APU with a two stage compressor and a load compressor 14, it would be understood by those of ordinary skill in the art that the in various embodiments other configurations of APU may be used (eg. single stage turbine), with or without a load compressor 14. Furthermore, although an APU 10 is provided for an example, other engines may use the vibration detection techniques including turboprops, turbofans, turbojets, as well as other types of rotating turbomachinery.

Figure 2A:
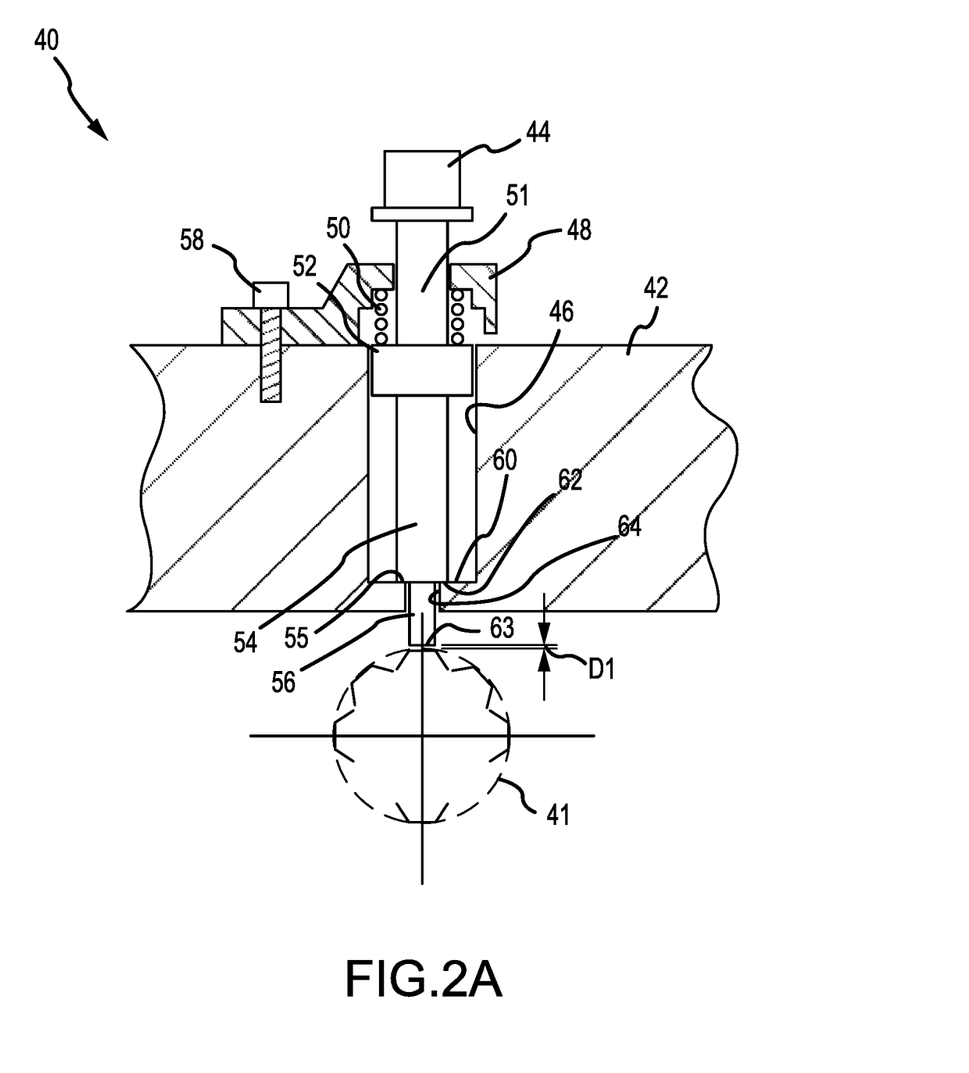
FIG. 2A illustrates an speed sensing assembly with a speed sensor located proximate a phonic wheel, in accordance with various embodiments.
Figure 2B:
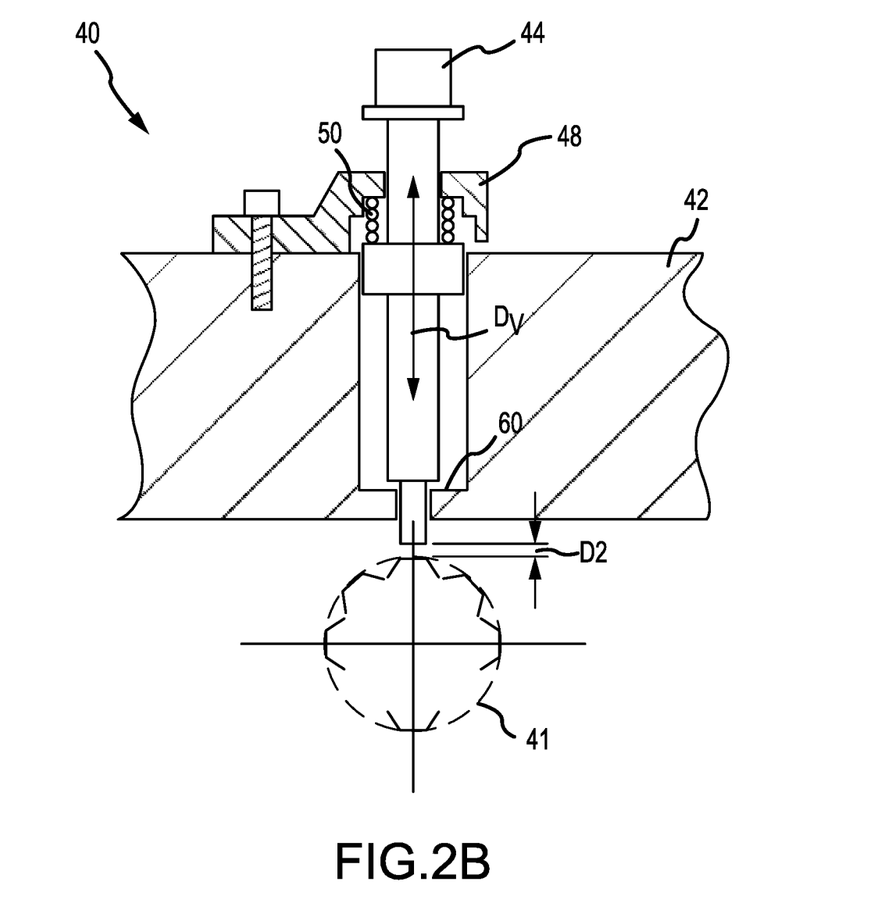
FIG. 2B illustrates a speed sensing assembly with a speed sensor located proximate a phonic wheel, in accordance with various embodiments.

Referring now to FIGS. 2A and 2B, a speed sensor assembly 40 is shown, in accordance with various embodiments. Speed sensor assembly 40 may be configured to detect revolutions of phonic wheel 41. Phonic wheel 41 may be configured to rotate with rotating components of APU 10 (or any other engine) such as, for example, load compressor 14, compressor 16, shaft 17, turbine 20, or turbine 22. In that regard, speed sensor assembly 40 may be configured to detect the engine speed (e.g., in revolutions per minute) of APU 10.

In various embodiments, speed sensor assembly 40 may include a housing 42 disposed proximate a rotating member and/or a phonic wheel 41. Speed sensor 44 may be disposed in cavity 46 defined in housing 42. Cavity 46 may comprise a geometry configured to receive speed sensor 44 with speed sensor able to shift within cavity 46 in vibration direction $D_V$. Speed sensor 44 may extend through housing 48. Housing 48 may be coupled to housing 42 by fastener 58. Housing 48 may be configured to retain speed sensor at least partially within cavity 46 of housing 42. Speed sensor 44 may be a magnetic and/or electromagnetic sensor configured to measure angular velocity of phonic wheel 41.

Referring now to FIG. 2A, spring 50 may be disposed around an upper portion 51 of speed sensor 44. Spring 50 may press against shoulder 52 of speed sensor 44 to apply a load to speed sensor 44. Spring 50 may thus urge body 54 of speed sensor 44 towards opening 64 in housing 42. Surface 55 of speed sensor 44 may rest against shoulder 62 of housing 42 with sensor portion 56 extending through opening 64 into a position adjacent phonic wheel 41. Sensing surface 63 of sensor portion 56 may rest a distance $D_1$ from phonic wheel 41 in response to surface 55 of speed sensor 44 resting against surface 60 on shoulder 62 of housing 42. Spring 50 may be tuned to maintain sensing surface 63 of speed sensor 44 at or near distance $D_1$ from phonic wheel 41 in response to predetermined acceleration loads. Spring 50 may comprise, for example, a Bellville washer, a coil, nested Bellville washers, or other suitable springs. As used herein, at or near distance $D_1$ is used to refer to at a position wherein speed sensor 44 may make accurate readings of the rotational speed of phonic wheel 41.

With reference to FIG. 2B, speed sensor assembly 40 is illustrated with speed sensor shifted away from phonic wheel 41 in vibration direction $D_V$. Spring 50 may compress between housing 48 and speed sensor 44 in response to a shift of speed sensor 44. Speed sensor 44 may shift in response to vibration in the engine (e.g., APU 10 of FIG. 1). Spring 50 may be tuned based on the weight of speed sensor 44 and the desired amount of displacement for a predetermined force. The predetermined force and distance $D_2$ may be selected to offset the force generated by an engine vibration (having an amplitude and frequency) and the acceleration experienced by speed sensor 44 having a predetermined mass in response to the vibration of the engine.

For example, spring 50 may be selected to have a spring constant so that spring 50 exerts a predetermined force on speed sensor 44. For example, spring 50 may be selected to exert a 5 lbs (2.3 kg) force on the speed sensor. Spring 50 may urge surface 55 of speed sensor 44 to contact housing 42. Assuming, for example, the weight of the speed sensor of 0.5 lbs (0.23 kg), a vibration acceleration of the engine with a greater magnitude than 10 times the gravitational force (10 Gs) in the direction of the installed speed sensor will start bouncing the speed sensor relative to the housing 42 and the phonic wheel (i.e., moving speed sensor 44 between distance $D_1$ and distance $D_2$ away from phonic wheel 41). Depending on the weight of the speed sensor and the desired vibration level to induce bouncing of the speed sensor against the engine housing/Phonic wheel, a spring constant of spring 50 may be selected according to Hooke's law. In that regard, Hooke's law may be used to select and/or tune spring 50. Hooke's law is represented by equations $E_1$ and $E_2$ below, where F is force, k is the spring constant, and X is the displacement distance:

$$F = kX; \text{ or} \quad (E_1)$$

$$k = \frac{F}{X} \quad (E_2)$$

Although a 0.5 lb load is used for exemplary purposes, other loads may be used to select a spring having the proper spring constant k may be selected for spring sensors of varying weights.

Figure 3:
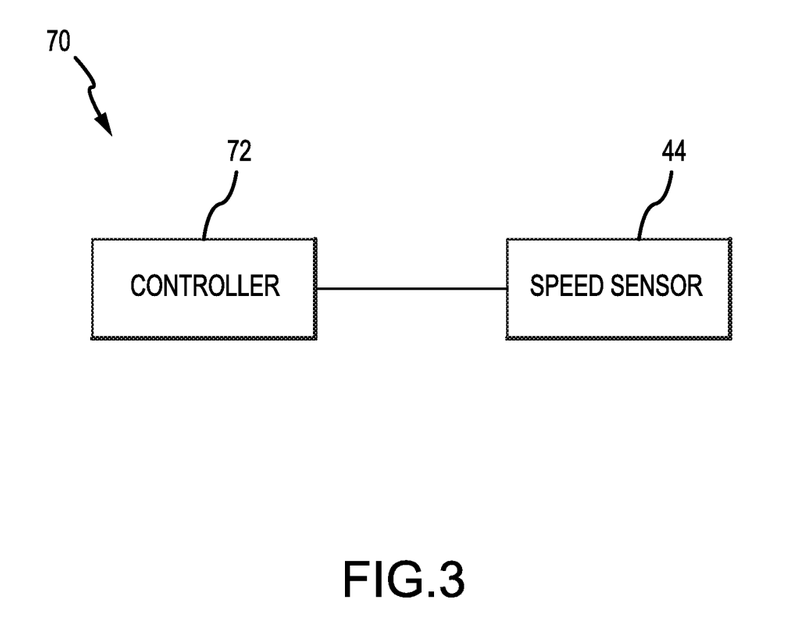
FIG. 3 an exemplary health monitoring system for a gas turbine engine using an electronic controller and a speed sensor, in accordance with various embodiments.

Referring now to FIG. 3, a health monitoring system 70 is shown, in accordance with various embodiments. Health monitoring system 70 may include a controller 72. Controller 72 may be, for example, a full authority digital engine control (FADEC) system including an electronic control box (ECB). The controller may also comprise another computer based-system. Controller 72 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor may thus be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

In various embodiments, controller 72 may be in electronic communication with speed sensor 44. Controller 72 may, for example, receive a signal from speed sensor 44 encoding a measurement of the rotational frequency of an engine. Controller 72 and speed sensor 44 may be in electronic communication via, for example, one or more of a wire, a bus, a circuit, a wireless channel, or another suitable electronic communication channel.

Figure 4:
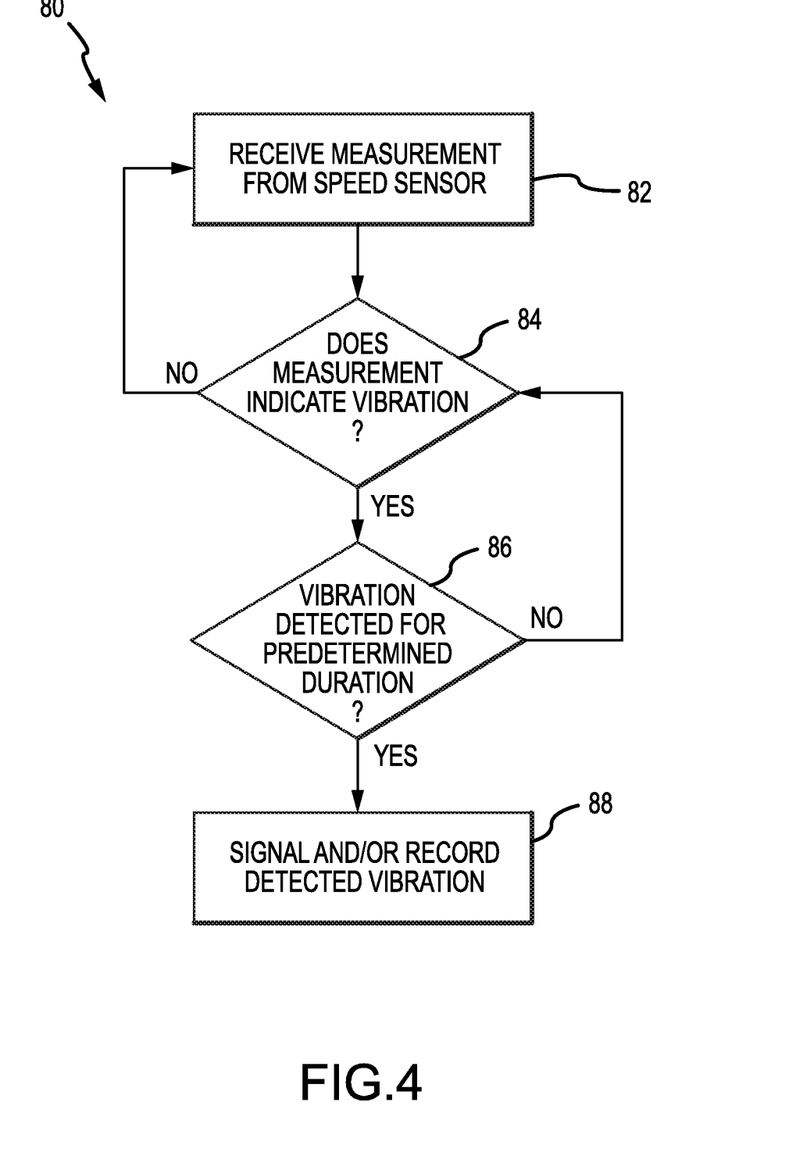
FIG. 4 illustrates a method for detecting engine vibration is shown, in accordance with various embodiments.

With reference to FIG. 4, a method 80 of monitoring engine health for detecting engine vibration using health monitoring system 70 (of FIG. 3) is shown, in accordance with various embodiments. In various embodiments, APU 10 (of FIG. 1) and speed sensor 44 (of FIGS. 2A and 2B) may be in electronic communication with controller 72 (of FIG. 3) configured to execute method 80. Controller 72 may receive a measurement from speed sensor 44 of FIGS. 2A and 2B (Block 82). The measurement may come from speed sensor 44 as a voltage or a current indicative of the rotational frequency of phonic wheel 41 and/or rotation of turbomachinery in APU 10 of FIG. 1. In that regard, the measurement may arrive at the controller in the form of a raw signal or a processed signal provided that the signal relates to the angular velocity of APU 10.

In various embodiments, the controller may determine whether the measurement from speed sensor 44 indicates vibration (Block 84). A measurement from speed sensor 44 may indicate a vibration if the measurement is erratic. The measurement may be erratic if the measurement indicates speeds that rapidly fluctuate. In that regard, a vibration may be detected in response to a measurement from speed sensor 44 indicating that the engine speed is fluctuating between a low-speed threshold and a high-speed threshold. For example, a vibration may be detected in response to the measurement from speed sensor 44 indicating that an engine speed fluctuating between 10 Hz and 400 Hz multiple times per second (or per 10 seconds, or per minute, as desired). The low-speed threshold may be 0 Hz, 10 Hz, 50 Hz, or any other predetermined and fixed threshold. Similarly, the high-speed threshold may be 350 Hz, 400 Hz, 430 Hz, or any other predetermined and/or fixed threshold. The low-speed threshold may also be a percentage variation from a recent high-speed. For example, vibration may be detected in response a speed sensor measurement suddenly (i.e., over 0.5 seconds, over 1 second, over 5 seconds, or over another duration) indicating that the engine is operating at or below 20% of 400 Hz (i.e., 80 Hz) after the engine had been operating at 400 Hz.

In various embodiments, in response to engine vibration not being detected, the controller may continue to monitor the measurements received from speed sensor 44. In response to engine vibration being detected, controller 72 may determine whether the vibration has been ongoing for a predetermined duration (Block 86). The predetermined duration may include a duration of 0 s to detect engine vibrations that occur for any period of time. The predetermined duration may also be set to a longer period of time such as, for example, 0.060 seconds, 1 second, 30 seconds, 1 minute, 5 minutes, 30 minutes, 1 hour, 1 day, or any other suitable duration of vibration for the engine. In response to the vibration being detected for a period of time less than the predetermined duration, the controller may continue to monitor the measurement from speed sensor 44. In response to the vibration being detected for a period of time greater than the predetermined duration, the controller may signal and/or respond to the vibration of the engine.

In various embodiments, the controller may signal and/or record the detected vibration (Block 88). The controller may signal that the vibration was detected by requesting maintenance, illuminating an in-cockpit indicator, shutting down the engine, reducing the speed of the engine, or otherwise signaling that engine vibration has been detected. The controller may also record details of the detected vibration. The recorded details may include the measured engine speeds and corresponding times at which the speeds were measured. In that regard, the vibrations may be logged for future analysis and review.

The vibration detection systems and methods of the present disclosure may enable health monitoring of gas turbine engines such as APUs, for example, using existing systems. The FADEC may be used to control the engine as well as monitor the signal from the speed sensors for vibration. Speed sensors employed to monitor engine speed may serve a dual purpose of monitoring engine speed and detecting vibrations based on erratic speed signals. In that regard, the vibration detection systems and methods of the present disclosure may enable engine health monitoring without the weight addition and space consumption of dedicated systems.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of monitoring engine health, comprising:
   receiving, by a controller, a measurement from a speed sensor configured to preload a spring based on a weight of the speed sensor and on a desired vibration level to induce bouncing of the speed sensor;
   determining, by the controller, that the measurement from the speed sensor indicates a vibration of an engine by the speed sensor bouncing from the engine exceeding a predetermined acceleration threshold;
   determining, by the controller, whether the vibration of the engine persisted for a predetermined duration; and
   signaling, by the controller, that the vibration of the engine is detected.

2. The method of claim 1, wherein the measurement from the speed sensor is at least one of a voltage and a current generated in response to rotation of a phonic wheel adjacent to the speed sensor.

3. The method of claim 1, wherein the signaling the vibration of the engine is detected further comprises at least one of requesting maintenance, illuminating an in-cockpit indicator, shutting down the engine, or reducing a speed of the engine.

4. The method of claim 1, wherein detecting the measurement from the speed sensor indicates the vibration further comprises detecting, by the controller, the measurement is fluctuating between a low-speed threshold and a high-speed threshold over a predetermined time interval.

5. The method of claim 4, wherein the low-speed threshold is less than 50 Hz.

6. The method of claim 4, wherein the high-speed threshold is greater than 350 Hz.

7. The method of claim 4, wherein the predetermined time interval is between 0.060 second and 1 hour.

8. An article of manufacture including a non-transitory, tangible computer readable storage medium having instructions stored thereon that, in response to execution by a processor, cause the processor to perform operations comprising:
   receiving, by the processor, a measurement from a speed sensor configured to detect a rotational frequency of a rotating member;
   detecting, by the processor, a vibration of an engine in response to the measurement from the speed sensor configured to bounce on a spring from the engine exceeding a predetermined acceleration threshold indicating erratic engine speeds; and
   signaling, by the processor, that the vibration of the engine is detected.

9. The article of claim 8, wherein the measurement from the speed sensor is at least one of a voltage and a current generated in response to rotation of a phonic wheel adjacent to the speed sensor.

10. The article of claim 8, wherein the signaling the vibration of the engine is detected further comprises at least one of requesting maintenance, illuminating an in-cockpit indicator, shutting down the engine, or reducing a speed of the engine.

11. The article of claim 8, wherein detecting an engine vibration in response to the measurement further comprises detecting, by the processor, the measurement is fluctuating between a low-speed threshold and a high-speed threshold over a predetermined time interval.

12. The article of claim 11, wherein the low-speed threshold is less than 50 Hz.

13. The article of claim 11, wherein the high-speed threshold is greater than 350 Hz.

14. The article of claim 8, further comprising determining, by the processor, the vibration of the engine has persisted for a predetermined duration.

\* \* \* \* \*